United States Patent [19]
Thornberg

[11] Patent Number: 5,260,089
[45] Date of Patent: Nov. 9, 1993

[54] FEED SUPPLEMENT COMPOSITION AND METHOD OF MANUFACTURING

[75] Inventor: Robert Thornberg, Walhalla, N. Dak.

[73] Assignee: Harvest Fuel, Inc., Walhalla, N. Dak.

[21] Appl. No.: 827,793

[22] Filed: Jan. 30, 1992

[51] Int. Cl.$^5$ .............................................. A23K 1/06
[52] U.S. Cl. ...................... 426/624; 426/74; 426/489; 426/520; 426/623; 426/630; 426/807
[58] Field of Search .............. 426/74, 624, 489, 807, 426/520, 623, 630

[56] References Cited

U.S. PATENT DOCUMENTS

| | | | |
|---|---|---|---|
| 1,020,091 | 3/1912 | Greenbaum | 426/624 |
| 2,222,306 | 11/1940 | Atwood | 426/624 |
| 2,263,608 | 11/1941 | Brown | 426/624 |
| 4,016,296 | 4/1977 | DeSantis | 426/69 |
| 4,027,043 | 5/1977 | Schroeder et al. | 426/69 |
| 4,160,041 | 7/1979 | Schroeder et al. | 426/69 |
| 4,171,385 | 10/1979 | Skoch et al. | 426/658 |
| 4,171,386 | 10/1979 | Skoch et al. | 426/658 |
| 4,234,608 | 11/1980 | Linehan | 426/72 |
| 4,349,578 | 9/1982 | Wright et al. | 426/623 |
| 4,431,675 | 2/1984 | Schroeder et al. | 426/69 |
| 4,560,561 | 12/1985 | Henderson et al. | 426/74 |
| 4,631,192 | 12/1986 | Mommer et al. | 426/69 |
| 4,729,896 | 3/1988 | Sawhill | 426/2 |
| 4,735,809 | 4/1988 | Donovan et al. | 426/69 |
| 4,800,088 | 1/1989 | Sawhill | 426/69 |
| 4,904,486 | 2/1990 | Donovan et al. | 426/69 |

*Primary Examiner*—R. B. Penland
*Attorney, Agent, or Firm*—Fredrikson & Byron

[57] ABSTRACT

A livestock feed supplement providing high by-pass protein, being substantially free of urea and molasses, and providing good palatability. The supplement is formulated using byproducts of grain alcohol fermentation, namely distillers dried grains obtained from the stillage of fermented, dry-milled whole grain, and condensed distillers solubles from such stillage. Standard amounts of other nutritional supplements, including vitamins and minerals, are added to the composition to form the block. The supplement may be compressed and cured into a substantially hard block for free-choice feeding, or packaged in its granular, somewhat moist form for subsequent mixing in livestock feed. The byproducts of the fermentation include natural flavors that provide good palatability without the addition of sweeteners such as molasses.

13 Claims, 3 Drawing Sheets

FEED SUPPLEMENT COMPOSITION AND METHOD OF MANUFACTURING

FIELD OF THE INVENTION

The invention relates to livestock feed supplements and methods of manufacturing them. In particular, the invention relates to a molasses free, urea free, high by-pass protein feed supplement in block form, and a method of making such a feed supplement in block.

BACKGROUND OF THE INVENTION

Feed supplements are routinely used in raising livestock to assure that the livestock receive sufficient nutrients in their diet, including protein, vitamins and minerals. Such supplements are often fed either in block form, allowing the livestock to feed on a free-choice basis, or mixed into livestock feed in predetermined proportions. When free-choice feeding blocks are used, the amount of such supplement consumed by livestock can generally be controlled by controlling the hardness and palatability of the block.

Feed supplement blocks typically are molasses-based, the molasses providing palatability to the block, and also providing hardness to the block after it is cured, either through evaporative heating and/or chemical curing. Further background on these techniques is provided in U.S. Pat. No. 4,729,896 (Sawhill). Feed supplement mix often also includes molasses as a sweetener to increase palatability of the resultant feed mixture, to assure the livestock ingest the entire portion of nutritionally supplemented feed fed to them.

Such molasses-based feed supplements typically utilize urea as a protein source. Molasses itself typically has only about 8% protein. Urea is therefore often added to increase the total protein content to, e.g., about 20-24% of the feed supplement. Even at these levels, however, since not all of the urea gets metabolized, the "effective" amount of protein is less than the formulated amount.

In ruminant animals (cattle, goats, sheep, etc.), the urea is processed by the animal's digestive system into needed proteins. Non-ruminant animals (such as pigs, horses, dogs, and young calves), however, do not have the ability to metabolize urea, and the urea can be toxic to them. Thus, free-choice block-type feed supplements must be kept away from non-ruminant animals, which can sometimes be a problem—even if, e.g., horses are kept seperately from cattle, or calves are kept seperately from grown cattle, there is always the danger that the animals will break down fences, etc., obtain access to the feed supplement and consume a toxic quantity before being discovered. If a livestock raiser has a dog, the dog similarly must be kept away from the feed supplement block.

There is a need, therefore, for high-protein feed supplements that do not utilize urea. Although other protein sources are available, such as soybean meal, often they are relatively expensive. Also, there is a desire to have feed supplements that do not rely on sweeteners (such as molasses) to give the product acceptable (even desirable) palatability.

SUMMARY OF THE INVENTION

The invention comprises a highly palatable feed stock supplement providing high by-pass protein (i.e., protein that can be directly absorbed in the animal's intestine without having to be metabolized in a ruminant animal's stomachs) without using molasses or urea. Rather, the supplement is formulated using byproducts of grain alcohol fermentation, namely distillers dried grains obtained from the stillage of fermented, dry-milled whole grain, and condensed distillers solubles from such stillage. Standard amounts of other nutritional supplements, including vitamins and minerals, are added to the composition. The supplement may be formed into a relatively hard block for free-choice feeding or it may be mixed into livestock feed in granular form. In either case, the supplement provides good palatability without the addition of sweeteners (such as molasses) and high by-pass protein without the addition of urea.

The invention also relates to the method of manufacturing such a feed supplement. The method involves obtaining condensed distillers' solubles and distillers dried grains. Theses products are obtained by seperating the wet stillage (from which alcohol has been removed) from a grain alcohol still into a liquid fraction (containing condensed distillers solubles) and a solid fraction (containing distillers dried grains). From about 25% to about 65% by weight of such dried grains is mixed with from about 10% to about 45% by weight of a pre-mixed base of selected nutritional supplements (which typically includes about 1% to about 6% by weight of magnesium oxide), and from about 20% to about 45% by weight of the condensed distillers solubles. Preferably the condensed distillers solubles has from about 50-70% by weight moisture—the total moisture content of the formulation can be controlled by adjusting the relative amounts of the dried grains (and other dry ingredients) in comparison to the amount of the condensed distillers solubles, and, to a certain degree, by adjusting the moisture content of the condensed distillers solubles. Desirably the final moisture content is between about 15% and about 30%, and most preferably in the range of about 22-25%.

The resulting mixture, which is somewhat granular and slightly moist, can then either be formed and cured into a relatively hard block, or it can be packaged in its slightly moist granular form for subsequent mixture into livestock feed. If made into a block, the mixture is placed in a container (preferably a round, open-topped drum) and compressed. The container and contents are then cured at a temperature of about 90° F. to about 125° F. to form a substantially solid block.

The precise formulation, including the total amount of moisture in the mixture, can be adjusted depending on the application—in a preferred embodiment the moisture content of the granular mixture is slightly less (about 22%) than the preferred moisture content for the block form (which is desirably about 25%).

BEST MODE FOR CARRYING OUT THE INVENTION

Figure 1:
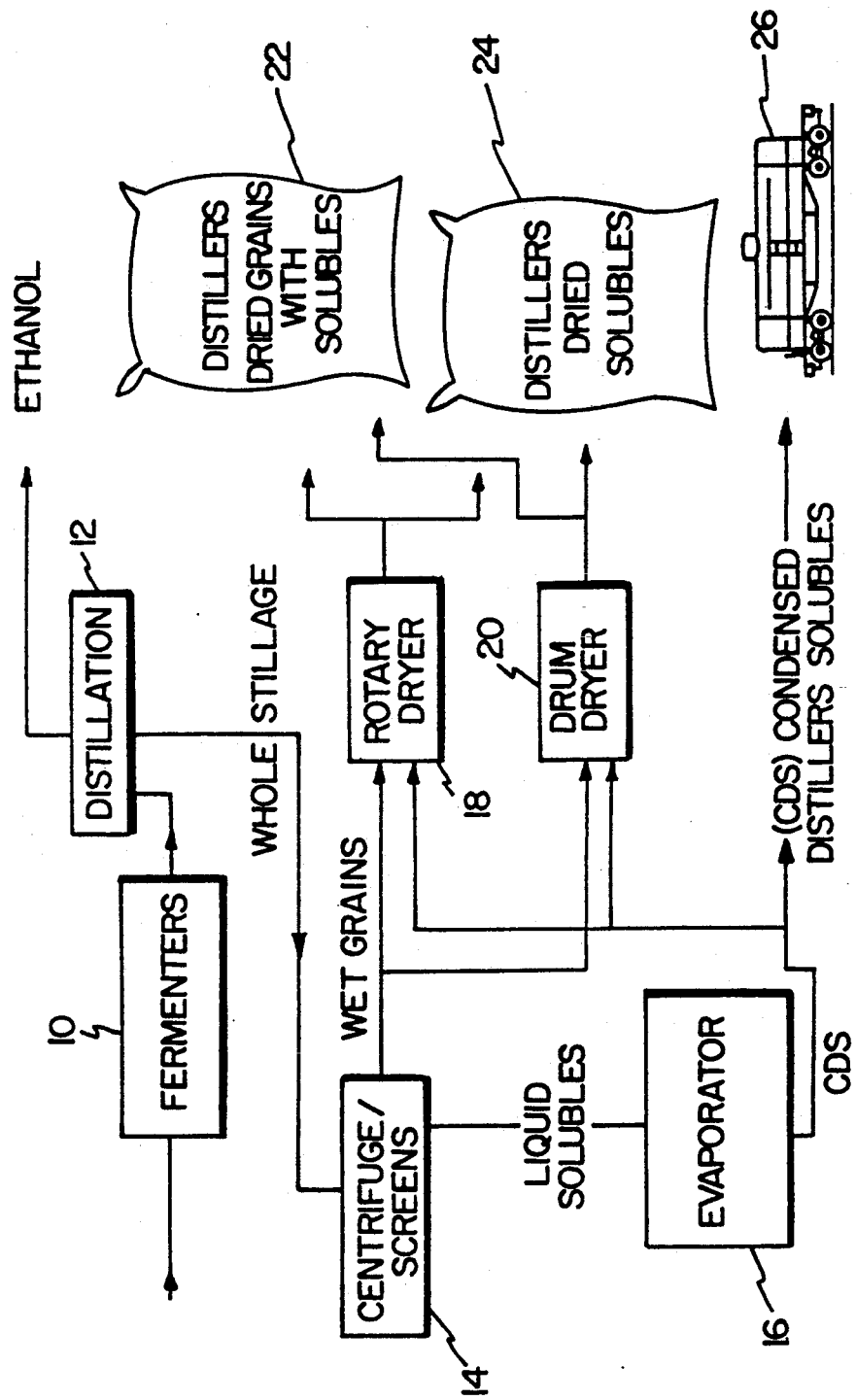
FIG. 1 shows schematically the production of distillers grains and condensed distillers solubles.

FIG. 1 depicts schematically the steps involved in dry mill fermentation ethanol production, the by-products of which can be used in applicants feed supplement. Whole grain is dry milled, fermented, and the resultant ethanol is distilled off. The remaining whole stillage is then seperated by screening or centrifuging into two streams—one is a generally solid (though wet) fraction called "wet distillers grains," and the other is a generally liquid fraction containing dissolved/suspended substances, called "liquid distillers solubles." The wet grains proceed to a dryer (typically a rotary dryer or a drum dryer), where the remaining moisture is driven off to leave "Distillers Dried Grains" ("DDG"). The liquid fraction usually is further processed through an evaporator to remove some of the water, thus condensing the liquid fraction into a smaller volume, called "Condensed Distillers Solubles" ("CDS") (which still may have as much as 50–70% water, by weight). The CDS may optionally be further dried, resulting in distillers dried solubles, or mixed with the wet grains and dried to produce "distillers dried grains with solubles" ("DDGS").

The protein content and palatability of the DDG and CDS is such that it makes a very good base for a feed supplement without the need to use sweeteners (such as molasses) or concentrated protein supplements such as urea. In a preferred formulation, from about 25% to about 65% by weight of the DDG (with or without dried solubles) is mixed with from about 20 or 30% to about 45% by weight of CDS and from about 5% to about 45% of a pre-mixed base of selected nutritional supplements, which preferably includes from about 0.5% to about 6% by weight of magnesium oxide. The following chart illustrates broad ranges and particularly preferred ranges of these ingredients, including some preferred nutritional supplements (though it will be understood that various blends of minerals, etc., can be adjusted to meet the particular requirements of a given dietary need, and the presence or absence of quantities of these additional supplements has some effect on the ratios of the remaining ingredients):

| INGREDIENT | WEIGHT % (BROAD RANGE) | WEIGHT % (PREFERRED RANGE) |
|---|---|---|
| CDS (1) | 20–45 | 35–40 |
| DDG | 25–70 | 35–65 |
| *Ground Cereal Grain (2) | 0–5 | 1–3 |
| *Additional Protein (3) | 0–20 | 2–5 |
| *Sodium Chloride | 1–20 | 8–15 |
| *Magnesium Oxide | 0.5–6 | 2–4 |
| *Potassium Chloride | 0–5 | 0.5–1.5 |
| *Calcium Source (4) | 2–8 | 3–5 |
| *Phosphorus Source (5) | 1–10 | 2–4 |
| *Vitamins A, D, E, and Trace Minerals | 0–2 | 0.25–0.75 |

(1) The moisture content of the CDS may be in the range of 50-70%, but preferably is about 55-65%.
(2) Preferably wheat, corn, barley, and/or grain sorgum
(3) Preferably meat and bone meal, blood meal, fish meal, soybean meal, canola meal, sunflour meal, and/or wheat milling by-products
(4) Preferably calcium carbonate, calcium sulfate, and/or calcium chloride
(5) Preferably dicalcium phosphate, mono/dicalcium phosphate, and/or mono ammonuim phosphate Any or all of the ingredients identified above with an "*" can easily be pre-blended in the proper proportions as a "Base Mix" to greatly simplify mixing.

In a preferred method of manufacturing, 5% of the total amount of the DDG is first place in a ribbon mixer (shown schematically in FIG. 3 as 30), to coat the bottom of it. The nutritional supplements and CDS are then added, and blended well, forming a somewhat soupy mixture. Since the CDS contains substantial all of the moisture in the formula, thorough blending at this point will assure very uniform distribution of the minerals and salts throughout the batch. This is particularly important in that the resultant feed supplement (particularly when sold in granular form) can tolerate a relatively high moisture content without spoilage, since the minerals and salts in the system, which act as preservatives, are uniformly distributed.

In a particularly preferred way of carrying out the process, CDS is piped into the mixer through pipe 34 (FIG. 3) substantially directly from the evaporator of an ethanol plant, so that its temperature is still elevated—between about 70° F. and about 180° F., desirably between about 110°–170° F., and most preferably at about 150° F.

After the minerals and any other nutritional supplements have been fully blended, the other 95% of the dried grains (DDG) is then added (typically through an auger such as auger 32 of FIG. 3), resulting in a fairly doughy/somewhat granular mixture, not unlike brown sugar (except that the "granules" are larger than that of brown sugar, and the mixture is not quite as dense as brown sugar).

When all blending is finished, the resultant mixture can either be packaged in bags (typically plastic lined) for sale and later mixture by a feed mill or farmer into livestock feed, or it can be augered into barrels 50 for finishing as a hardened block.

Figure 3:
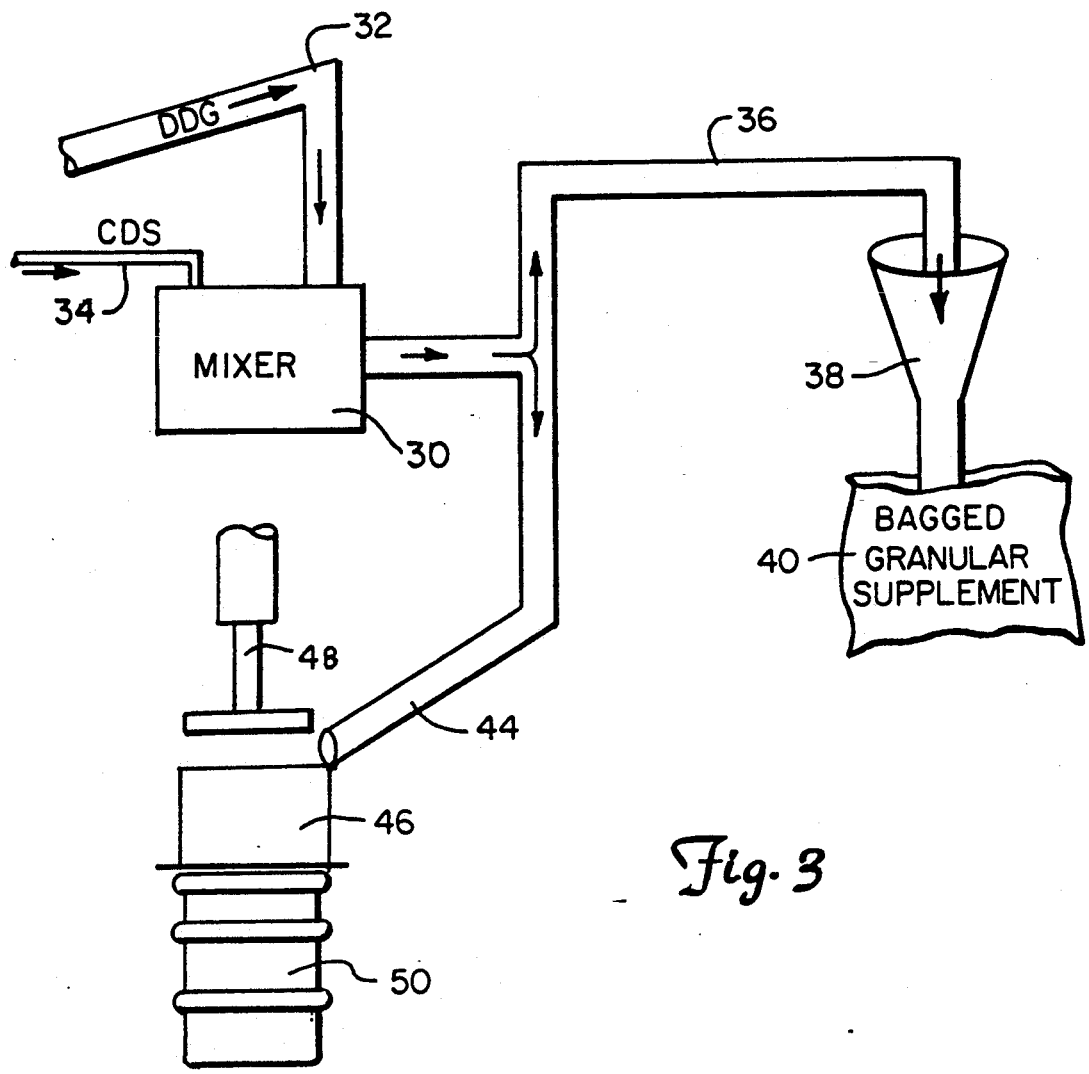
FIG. 3 shows in schematic form the method of manufacturing the supplement of the invention.

FIG. 3 depicts schematically the movement of the generally granular mixture through auger 36 and into funnel 38 for packaging in bags 40. Conventional packaging equipment can be utilized for this process.

Figure 2:
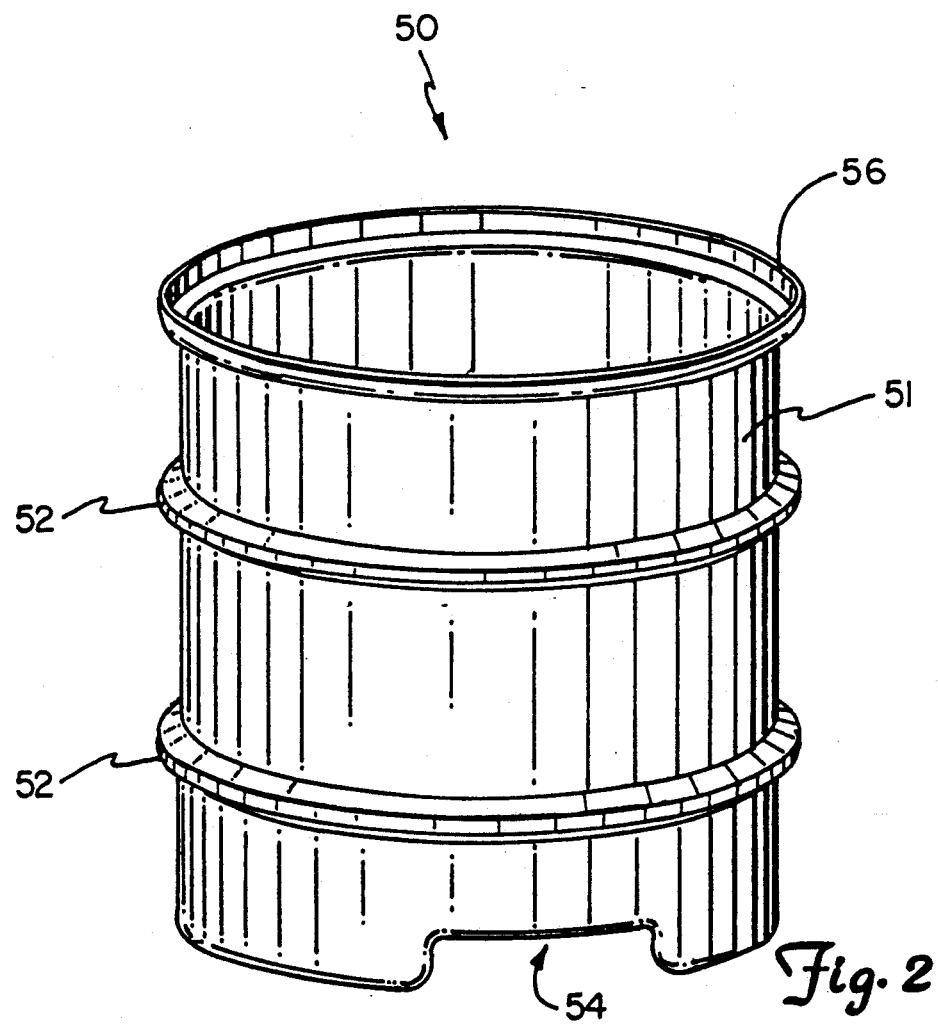
FIG. 2 shows a preferred barrel configuration for use in manufacturing the block form of the invention.

FIG. 2 also shows a preferred configuration for such a barrel 50, which is about 23" in diameter and about 22" tall, holding approximately 250 pounds of the mixture. This preferred embodiment of the barrel 50 includes reinforcing ribs 52, a lip 56 to facilitate stacking of the barrels when empty, and a slot 54 in the bottom to receive the fork of a fork lift. (This barrel configuration and use is set forth in greater detail in my co-pending application Ser. No. 07/822,298 filed Jan. 17, 1992, which is incorporated herein by reference.)

Figure 4:
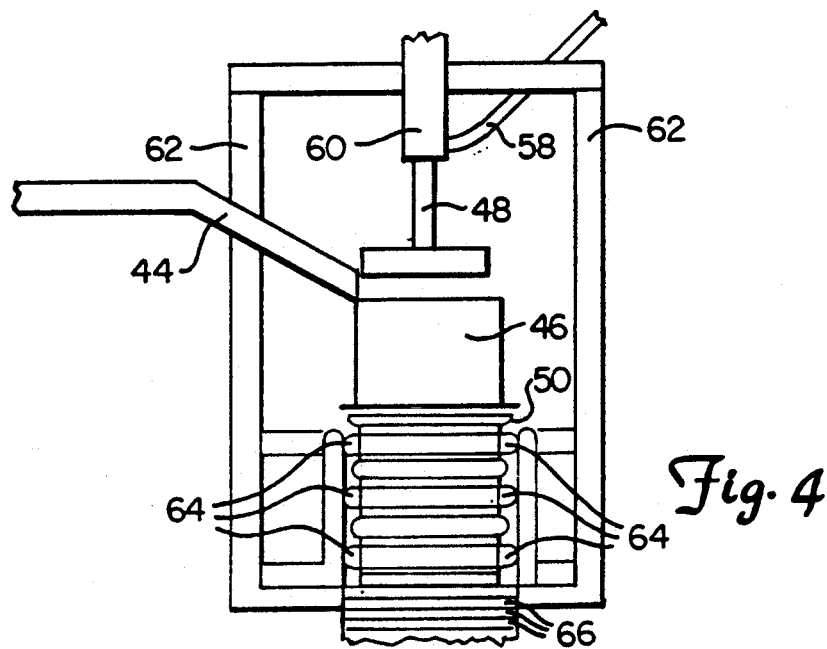
FIG. 4 shows shomewhat schematically a hydraulic ram configuration for compressing the supplement of the invention into block form in barrels.

FIG. 3 and 4 illustrate such a barrel 50 positioned beneath a funnel 46. Auger 44 brings the generally granular mixture into the funnel 46, which in turn directs the mixture into the barrel 50 and prevents spillage as a hydraulic ram 48 (driven by hydraulic cylinder 60 carried on frame 62) packs the mixture under a force of about 8–10 tons (about 50 psi). As the barrel 50 desirably is made from polyethylene or other suitable plastic, desirably metal support rings 64, which open and close to permit insertion and removal or the barrel, are secured about the barrel 50 during the compression step to prevent the barrel 50 from bursting under the pressure. The packed barrel is then cured at a temperature of about 90°–125° F. to form a substantially solid block.

The hardness of the block can be controlled by selecting the amount of moisture in the system, the length and temperature of curing, the amount of pressure applied in compacting the mixture before curing, and the amount and chemical activity of the magnesium oxide (which, by its hydroscopic nature and chemical activity, participates in curing of the resultant product). It has been found that Caustic Calcined Magnesite, 400 mesh, from Baymag FBG (Calgary, Alberta) has worked well as the magnesium oxide ingredient. When the mixture is prepared to be bagged in granular form rather than pressed and cured in block form, the amount of magnesium oxide and other minerals can be reduced (as illustrated in the following examples). Also, while desirably the total moisture content of the block before curing is about 20-30%, and most preferably about 25%, the desirable moisture content of the granular mixture packaged in bags may be slightly less—preferably about 22%.

As described above, the DDG and CDS both are products of the grain fermentation process. As such, they carry yeast-like (or yeast-generated) flavors that are highly palatable for livestock. This high palatability usually eliminates the need to add sweeteners, such as molasses, to the feed supplement to assure that the livestock will eat the entire portion offered.

EXAMPLE 1

The following ingredients were added to a large ribbon mixer, in the order indicated, and for the length of mixing indicated before the next ingredient was added, beginning with a small portion (about 193 pounds) of the Distillers Dried Grains with Solubles (DDGS) (the balance—about 95%—of the DDGS being added as the last ingredient). Addition of the Condensed Distillers Solubles to the other dry ingredients before addition of the bulk of the dried grains creates a generally soupy mixture, thereby assuring thorough mixing of the salt and other minerals that act as preservatives for the final product.

| INGREDIENT | WEIGHT (POUNDS) | WEIGHT % OF TOTAL | MIX TIME (MINUTES) |
|---|---|---|---|
| DDGS | 193 | 1.8 | 0 |
| Base Mix | 1,114 | 10.7 | 3 |
| Magnesium Oxide | 440 | 4.2 | 2 |
| Sodium Chloride | 1,125 | 10.8 | 3 |
| CDS | 3,875 | 37.3 | 25 |
| DDGS | 3,658 | 35.2 | 10 |
| | 10,405 | 100.0 | 45 |

The Base Mix had the following composition:

| INGREDIENT | WEIGHT (POUNDS) | WEIGHT % OF TOTAL |
|---|---|---|
| Wheat Flour | 150 | 1.4 |
| Meat/Bone Meal | 275 | 2.6 |
| Potasium Chloride | 75 | 0.7 |
| Calcium Sulfate | 300 | 2.9 |
| Vitamins/Trace Minerals Premix | 29 | 0.3 |
| Dicalcium Phosphate | 285 | 2.7 |
| | 1,114 | 10.6 |

To simplify mixing, the Base Mix could also include the magnesium oxide, the sodium chloride and any other optional nutritional supplements as desired.

After blending of the above mixture was completed, the resultant generally granular mixture, which had a total moisture content of about 25%, was packed in the above-mentioned drums under approximately 8-10 tons of pressure, and then cured for about 36-48 hours at 100° F. Upon evaluation for hardness of the resultant product, a stainless steel probe could be manually pushed only slowly and steadily into the product, indicating that relatively uniform hardness had been achieved throughout the product.

Chemical analysis of the product indicated that it possessed about 16% by weight protein which has high rumen by-pass value—i.e., protein that does not need to be metabolized in a ruminant animals stomachs before being utilized by the animal; thus, the formula provides protein approximately equivalent to a urea-supplemented product having 24% protein (since the urea must be metabolized and a significant portion of the theoretically available protein does not typically enter the animals system—much gets excreted before being metabolized).

EXAMPLE 2

The following ingredients were added to a large ribbon mixer, in the order indicated, and for the length of mixing indicated before the next ingredient was added, beginning with five percent (about 387 pounds) of the Distillers Dried Grains with Solubles (DDGS) (the balance, 95%, of the DDGS being added as the last ingredient).

| INGREDIENT | WEIGHT (POUNDS) | WEIGHT % OF TOTAL | MIX TIME (MINUTES) |
|---|---|---|---|
| DDGS | 387 | 3.2 | 0 |
| Base Mix | 340 | 2.8 | 3 |
| Sodium Chloride | 240 | 2.0 | 5 |
| CDS | 3,900 | 31.9 | 15 |
| DDGS | 7,353 | 60.2 | 15 |
| | 12,220 | 100.0 | 38 |

The Base Mix had the following composition:

| INGREDIENT | WEIGHT (POUNDS) | WEIGHT % OF TOTAL |
|---|---|---|
| Meat/Bone Meal | 36 | 0.29 |
| Calcium Carbonate | 125 | 1.02 |
| Potasium Chloride | 9 | 0.07 |
| Calcium Sulfate | 36 | 0.29 |
| Dicalcium Phosphate | 34 | 0.28 |
| Magnesium Oxide | 100 | 0.82 |
| | 340 | 2.77 |

Addition of the Condensed Distillers Solubles to the other dry ingredients before addition of the bulk of the dried grains creates a generally soupy mixture, thereby assuring thorough mixing of the salt and other minerals that act as preservatives for the final product. After blending of the above mixture was completed, the resultant mixture was generally granular and slightly moist (about 22% moisture): if squeezed, it would pack together, but is easily crumbled. Portions of the mixture were packed in poly-lined 50 pound bags for use by feed mills or livestock producers as a supplement to be blended into livestock feed. Yeast like flavors, primarily from the CDS (resulting from the grain fermentation process) give very good palatability to the product without the addition of sweeteners such as molasses, and therefore increase the likelihood that the livestock will consume the entire portion given. Chemical analysis of the product indicated that it possessed about 18-20% by weight of protein which had a high rumen by-pass value.

The Base Mix of minerals and any other optional supplements, etc. in the above examples may vary widely depending on the intended use of the feed supplement—different ratios of such components can be selected based on the nutritional requirements that the supplement is intended to meet. Also, note that the total moisture content of the resultant granular mixture in Example 2 is less than the moisture content in Example 1 (preferably about 22% rather than about 25%), the adjustment being effected by reducing the amount of CDS in the formula (since the CDS is the only ingredient containing any significant amount of water).

In both examples, because the resultant product does not contain urea, free-feeding of the supplement by both ruminant and non-ruminant animals is possible. Thus, e.g., one can feed the supplement of the invention to cattle without worrying about the farm dog ingesting it; similarly, young calves can be in a pen with their mothers without danger of them ingesting potentially lethal quantities of urea; and horses can share pasture land with cattle without fear that the horses will get sick from the supplement.

While a preferred embodiment of the present invention has been described, it should be understood that various changes, adaptations and modifications may be made therein without departing from the spirit of the invention and the scope of the appended claims.

What is claimed is:

1. In a method of manufacturing a livestock feed supplement wherein:
   wet stillage, from which alcohol has been removed, from a grain alcohol still is separated into a liquid fraction containing condensed distillers solubles and a solid fraction containing distillers dried grains the improvement consisting essentially of;
   selecting and mixing together:
      from about 5% to about 45% by weight of a premixed base of selected nutritional supplements excluding molasses and urea;
      from about 20% to about 45% by weight of said condensed distillers solubles having from about 50%-70% by weight water; and
      from about 25% to about 70% by weight of said dried grains;
   wherein the total moisture content of the mixture is adjusted to give the resulting mixture a granular, formable consistency having between about 15% and about 30% by weight water.

2. The method of claim 1 wherein from about 1% to about 6% by weight of magnesium oxide is added the resulting mixture is placed in a container and compressed under high pressure and cured at a temperature of from about 90° F. to about 125° F. to form a substantially solid block.

3. The method of claim 2 wherein the mixture is compressed under a pressure of at least about 40 psi.

4. The method of claim 1 wherein the total moisture content of the mixture before curing is from about 20% to about 30%.

5. The method of claim 1 wherein the total protein content of the resulting block is at least about 14%.

6. The method of claim 1 wherein the nutritional supplement is mixed with a substantial portion of the condensed distillers solubles before a substantial portion of the distillers grain is added so that the nutritional supplement is thoroughly distributed throughout the resulting mixture.

7. The method of claim 1 wherein the total moisture content of the mixture, before it is cured, is adjusted by selecting the relative amount of condensed distillers solubles.

8. In a method of manufacturing a livestock feed supplement block wherein dry-milled whole grain is fermented and alcohol is distilled from the fermented grain to leave a substantially alcohol-free wet stillage;
   wet stillage being separated into a liquid fraction containing palatable condensed distillers solubles and a solid fraction containing distillers dried grains with solubles;
   the improvement consisting essentially of:
   mixing together
      from about 25% to about 65% by weight of such dried grains;
      from about 5% to about 45% by weight of a premixed base of selected nutritional supplements including from about 1% to about 6% by weight of magnesium oxide; and
      from about 30% to about 45% by weight of the condensed distillers solubles having a moisture content selected to give the resulting mixture a granular, formable consistency having total moisture content of about 20-30%;
   placing the resulting mixture in a container and compressing it; and
   curing the block at a temperature of from about 90° F. to about 125° F. to form a highly palatable, urea-free substantially solid block.

9. In a method of manufacturing a livestock feed supplement, wherein dry-milled whole grain in fermented and alcohol is distilled from the fermented grain to leave a substantially alcohol-free wet stillage.
   said wet stillage is separated into a liquid fraction containing palatable condensed distillers solubles and a solid fraction containing distillers dried grains with solubles;
   the improvement consisting essentially of mixing together:
      from about 25% to about 65% by weight of said dried grains;
      from about 5% to about 45% by weight of a premixed base of selected nutritional supplements; and
      from about 20% to about 45% by weight of the condensed distillers solubles, said mixture having a moisture content selected to give a highly palatable urea-free mixture of granular, formable consistency having total moisture content of about 20-30%.

10. A livestock feed supplement block consisting essentially of:
    from about 25% to about 65% by weight of distillers dried grains obtained from stillage of fermented, dry-milled whole grain;
    from about 5% to about 45% by weight of a premixed base of selected nutritional supplements including from about 1% to about 6% by weight of magnesium oxide; and
    from about 20% to about 45% by weight of condensed distillers solubles from such stillage, having a moisture content selected to give the resulting mixture a granular, formable and compressable consistency with a total moisture content of about 15-30% wherein the nutritional supplement does not contain urea or molasses, said block possessing good livestock palatability and a total protein content of at least about 14%, said protein content having a high rumen bypass value.

11. The block of claim 10 wherein the total moisture content of the mixture, before it is cured, is adjusted by selecting the relative amount of condensed distillers solubles.

12. A feed supplement consisting essentially of:
from about 25% to about 65% by weight of distillers dried grains obtained from stillage of fermented, dry-milled whole grain;
from about 5% to about 45% by weight of a premixed base of selected nutritional supplements; and
from about 20% to about 45% by weight of condensed distillers solubles from such stillage, having a moisture content selected to give the resulting mixture a granular, formable and compressable consistency with a total moisture content of about 15-30%, wherein the nutritional supplement does not contain urea or molasses, the supplement possessing high livestock palatability and total protein content of at least about 14%, said protein content having a high rumen bypass value.

13. The supplement of claim 12 wherein the total moisture content of the mixture, before it is cured, is adjusted by selecting the relative amount of condensed distillers solubles.

* * * * *